(12) United States Patent
Swink et al.

(10) Patent No.: US 10,378,223 B2
(45) Date of Patent: Aug. 13, 2019

(54) INTERLOCKING FORM ASSEMBLY

(71) Applicant: ABT, INC., Troutman, NC (US)

(72) Inventors: Gery Swink, Murraville, GA (US); Ken Mahaffey, Lawrenceville, GA (US)

(73) Assignee: ABT, Inc., Troutman, NC (US)

( * ) Notice: Subject to any disclaimer, the term of this patent is extended or adjusted under 35 U.S.C. 154(b) by 0 days.

(21) Appl. No.: 14/777,431

(22) PCT Filed: Mar. 17, 2014

(86) PCT No.: PCT/US2014/030446
§ 371 (c)(1),
(2) Date: Sep. 15, 2015

(87) PCT Pub. No.: WO2014/145645
PCT Pub. Date: Sep. 18, 2014

(65) Prior Publication Data
US 2016/0010347 A1    Jan. 14, 2016

Related U.S. Application Data

(60) Provisional application No. 61/798,029, filed on Mar. 15, 2013.

(51) Int. Cl.
*B32B 3/06* (2006.01)
*E04G 9/05* (2006.01)
(Continued)

(52) U.S. Cl.
CPC ............... *E04G 9/05* (2013.01); *B32B 3/06* (2013.01); *E04C 1/00* (2013.01); *E04C 2/322* (2013.01); *E04G 9/10* (2013.01); *E04C 3/20* (2013.01)

(58) Field of Classification Search
CPC ....... E04B 2002/021; E04B 2002/0204; E04B 2002/0206; E04B 2002/0208;
(Continued)

(56) References Cited

U.S. PATENT DOCUMENTS

| 263,914 A | * | 9/1882 | Kern | ...................... E04F 15/04 |
| | | | | 52/592.1 |
| 468,838 A | * | 2/1892 | Steiger | ...................... E04B 2/04 |
| | | | | 52/284 |

(Continued)

OTHER PUBLICATIONS

International Searching Authority/US. International Search Report and Written Opinion of International Application No. PCT/US2014/030446 dated Aug. 8, 2014. English Language. 10 pages.
(Continued)

*Primary Examiner* — Michael Safavi
(74) *Attorney, Agent, or Firm* — Moore & Van Allen PLLC; Henry B. Ward, III

(57) ABSTRACT

A form assembly for creating structural supports is disclosed. Embodiments of the present invention provide a form assembly for molding a structural support of a predetermined configuration using a moldable forming composition. The present invention provides non-planar interlocking stackable form members for adjusting the height of molded support structures such as joists and beams.

20 Claims, 5 Drawing Sheets

(51) Int. Cl.
  *E04G 9/10* (2006.01)
  *E04C 2/32* (2006.01)
  *E04C 1/00* (2006.01)
  *E04C 3/20* (2006.01)
(58) Field of Classification Search
  CPC ..... E04B 2002/0213; E04B 2002/0215; E04B 2002/0217; E04B 2002/0219; E04B 2002/0221; E04B 2002/0223; E04C 1/00; E04C 2/322; E04C 3/20; E04G 9/00; E04G 9/05; E04G 9/10; B32B 3/06; B32B 3/263; B32B 3/30; B32B 27/065
  USPC ............ 52/604, 592.1, 592.6; 446/124, 125; 264/31; 428/141, 156, 158, 161, 162, 428/163, 167; 42/233
  See application file for complete search history.

(56) References Cited

U.S. PATENT DOCUMENTS

| | | | | |
|---|---|---|---|---|
| 513,423 A * | 1/1894 | Schmall | ............ | E04B 2/42 52/415 |
| 1,186,537 A * | 6/1916 | Becker | ............ | E04B 2/04 52/284 |
| 1,258,580 A * | 3/1918 | Lassiter | ............ | F16B 7/025 24/136 R |
| 1,655,383 A * | 1/1928 | Bean | ............ | F22B 13/08 110/198 |
| 1,710,833 A * | 4/1929 | Mirabella | ............ | E04B 2/18 52/503 |
| 1,983,040 A * | 12/1934 | Lyons | ............ | E04F 13/002 428/191 |
| 2,132,757 A * | 10/1938 | Paulson | ............ | A63H 33/04 376/459 |
| 2,561,933 A * | 7/1951 | Longenecker | ............ | F27D 1/0026 432/251 |
| 3,145,504 A * | 8/1964 | Dunnington | ............ | E04B 1/6179 52/284 |
| 3,435,576 A * | 4/1969 | Giannelia | ............ | E04B 2/12 405/285 |
| 3,440,784 A * | 4/1969 | Onjukka | ............ | E04B 2/702 52/233 |
| 3,534,518 A * | 10/1970 | Zagray | ............ | E04B 2/46 52/258 |
| 3,834,108 A * | 9/1974 | Ludvigsen | ............ | E01C 5/00 52/592.6 |
| 4,035,975 A * | 7/1977 | Gergely | ............ | E04B 2/18 52/284 |
| 4,040,226 A * | 8/1977 | Fernaeus | ............ | B28B 3/123 52/592.6 |
| 4,147,007 A * | 4/1979 | Eppich | ............ | F16B 5/07 446/114 |
| 4,186,540 A * | 2/1980 | Mullins | ............ | E04B 2/18 52/592.6 |
| 4,197,669 A * | 4/1980 | Hynes | ............ | A63H 33/084 446/125 |
| 4,241,554 A * | 12/1980 | Infantino | ............ | E04C 2/30 428/15 |
| 4,439,967 A * | 4/1984 | Dielenberg | ............ | E04B 2/26 52/309.12 |
| 4,441,298 A * | 4/1984 | Limousin | ............ | A63H 33/088 52/592.2 |
| 4,510,725 A * | 4/1985 | Wilson | ............ | E04C 1/40 428/116 |
| 4,765,109 A | 8/1988 | Boeshart | | |
| 4,787,185 A * | 11/1988 | Gascho | ............ | E04B 2/702 405/284 |
| 4,791,767 A | 12/1988 | Boeshart | | |
| 4,815,897 A * | 3/1989 | Risi | ............ | E02D 29/0216 405/273 |
| 4,889,310 A | 12/1989 | Boeshart | | |
| 4,903,447 A * | 2/1990 | McDade | ............ | E04B 2/702 52/233 |
| 4,916,879 A | 4/1990 | Boeshart | | |
| 4,918,888 A * | 4/1990 | Giles | ............ | E04B 2/707 52/220.1 |
| 4,932,812 A * | 6/1990 | Schaaf | ............ | E02D 29/025 405/284 |
| 4,936,540 A | 6/1990 | Boeshart | | |
| 4,936,712 A * | 6/1990 | Glickman | ............ | E02D 29/025 405/284 |
| 4,938,449 A | 7/1990 | Boeshart | | |
| 4,942,940 A | 7/1990 | Boeshart | | |
| 5,039,058 A | 8/1991 | Boeshart | | |
| 5,060,446 A * | 10/1991 | Beliveau | ............ | E04B 1/80 285/921 |
| 5,209,039 A | 5/1993 | Boeshart | | |
| 5,230,195 A * | 7/1993 | Sease | ............ | E04B 2/18 52/309.9 |
| 5,279,082 A * | 1/1994 | Scholta | ............ | E01C 5/00 405/284 |
| 5,400,845 A * | 3/1995 | Choiniere | ............ | E04B 2/703 144/329 |
| 5,428,933 A * | 7/1995 | Philippe | ............ | E04B 2/54 464/124 |
| D361,710 S | 8/1995 | Boeshart | | |
| 5,457,926 A * | 10/1995 | Jensen | ............ | E04B 2/18 52/309.4 |
| 5,493,830 A * | 2/1996 | Saarelainen | ............ | B27D 1/00 144/329 |
| 5,497,592 A | 3/1996 | Boeshart | | |
| 5,499,478 A * | 3/1996 | Rimmele | ............ | E04B 2/18 52/127.5 |
| D378,049 S | 2/1997 | Boeshart | | |
| 5,623,797 A * | 4/1997 | Gravier | ............ | E01F 8/0017 256/19 |
| 5,658,483 A | 8/1997 | Boeshart | | |
| D383,373 S | 9/1997 | Boeshart | | |
| D389,729 S | 1/1998 | Boeshart | | |
| 5,782,050 A | 7/1998 | Boeshart | | |
| 5,890,337 A | 4/1999 | Boeshart | | |
| 5,921,047 A * | 7/1999 | Walker | ............ | E04B 1/6141 52/282.2 |
| 5,934,037 A * | 8/1999 | Bundra | ............ | E04B 2/08 52/126.4 |
| 6,053,661 A * | 4/2000 | Lewis | ............ | E03F 1/002 405/258.1 |
| D436,018 S | 1/2001 | Boeshart | | |
| 6,176,059 B1 * | 1/2001 | Cantarano | ............ | E02D 29/0283 52/415 |
| 6,224,031 B1 | 5/2001 | Boeshart | | |
| 6,256,962 B1 | 7/2001 | Boeshart | | |
| 6,272,749 B1 | 8/2001 | Boeshart et al. | | |
| 6,401,419 B1 * | 6/2002 | Beliveau | ............ | E04B 2/8617 52/309.12 |
| 6,453,973 B1 * | 9/2002 | Russo | ............ | A47B 47/0075 160/135 |
| 6,592,961 B1 * | 7/2003 | Ruud | ............ | E04B 2/08 110/338 |
| 6,665,994 B1 * | 12/2003 | Ruggeri | ............ | E04B 2/14 52/592.6 |
| 6,802,160 B2 * | 10/2004 | Harambasic | ............ | E04B 1/04 446/124 |
| 6,817,150 B1 | 11/2004 | Boeshart | | |
| 6,935,075 B2 * | 8/2005 | Sherman | ............ | E04C 2/384 446/108 |
| 7,387,472 B2 * | 6/2008 | Abella | ............ | E02D 29/025 405/284 |
| 7,546,716 B1 * | 6/2009 | Asadurian | ............ | E04C 1/395 52/223.7 |
| 7,610,730 B2 * | 11/2009 | O'Connor | ............ | E04B 2/16 52/442 |
| 7,739,846 B2 * | 6/2010 | Garrett | ............ | E04B 2/8617 52/426 |
| 7,997,041 B2 * | 8/2011 | Slack | ............ | B01D 24/24 210/289 |
| 8,015,772 B2 * | 9/2011 | Jensen | ............ | E04B 2/54 405/262 |
| 8,061,095 B2 * | 11/2011 | Bucheger | ............ | E04B 2/44 52/223.7 |

(56) References Cited

U.S. PATENT DOCUMENTS

| | | | | |
|---|---|---|---|---|
| 8,464,489 | B2* | 6/2013 | Pervan | B44C 1/28 |
| | | | | 52/589.1 |
| 8,800,236 | B2* | 8/2014 | Yong | E01C 5/00 |
| | | | | 52/574 |
| 9,183,957 | B2* | 11/2015 | Farrell | G21F 1/04 |
| 9,238,910 | B2* | 1/2016 | Jensen | E04B 2/44 |
| 9,404,234 | B2* | 8/2016 | Jain | E02D 27/32 |
| 2002/0092253 | A1* | 7/2002 | Beliveau | B29C 44/1271 |
| | | | | 52/426 |
| 2003/0014937 | A1* | 1/2003 | Azar | E04B 2/06 |
| | | | | 52/604 |
| 2004/0261345 | A1* | 12/2004 | McGrath | B44C 5/04 |
| | | | | 52/506.01 |
| 2007/0113510 | A1* | 5/2007 | Evereff | E04B 2/06 |
| | | | | 52/592.6 |
| 2008/0172972 | A1* | 7/2008 | Williams | E04B 2/8635 |
| | | | | 52/592.6 |
| 2009/0013629 | A1 | 1/2009 | Boeshart | |
| 2009/0107074 | A1 | 4/2009 | Boeshart | |
| 2010/0050551 | A1 | 3/2010 | Boeshart | |
| 2011/0047920 | A1 | 3/2011 | Garrett | |
| 2011/0203203 | A1* | 8/2011 | Riviere | E04B 2/705 |
| | | | | 52/233 |

OTHER PUBLICATIONS

Canadian Office Action and Examination Search Report dated Oct. 19, 2016, for related Canadian Patent Application No. 2,906,897.

* cited by examiner

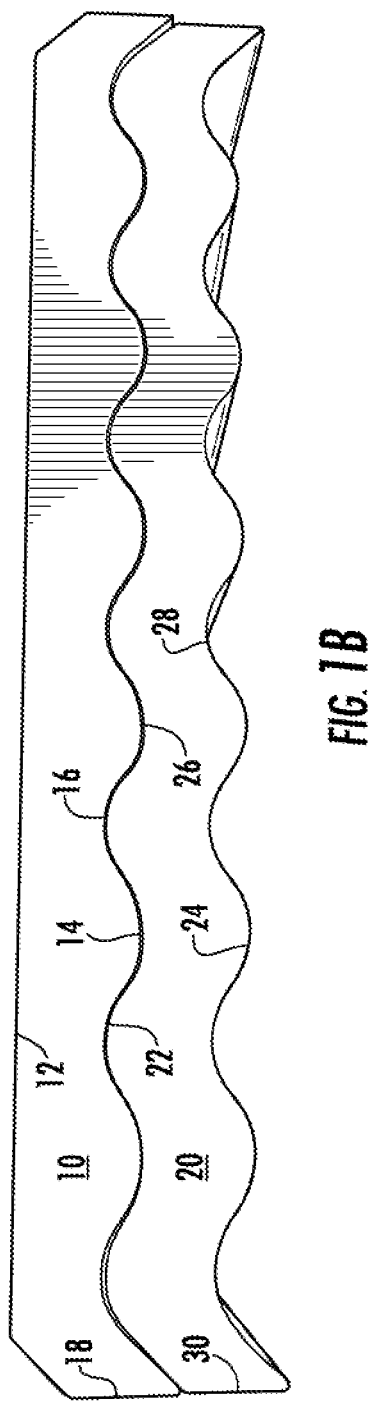

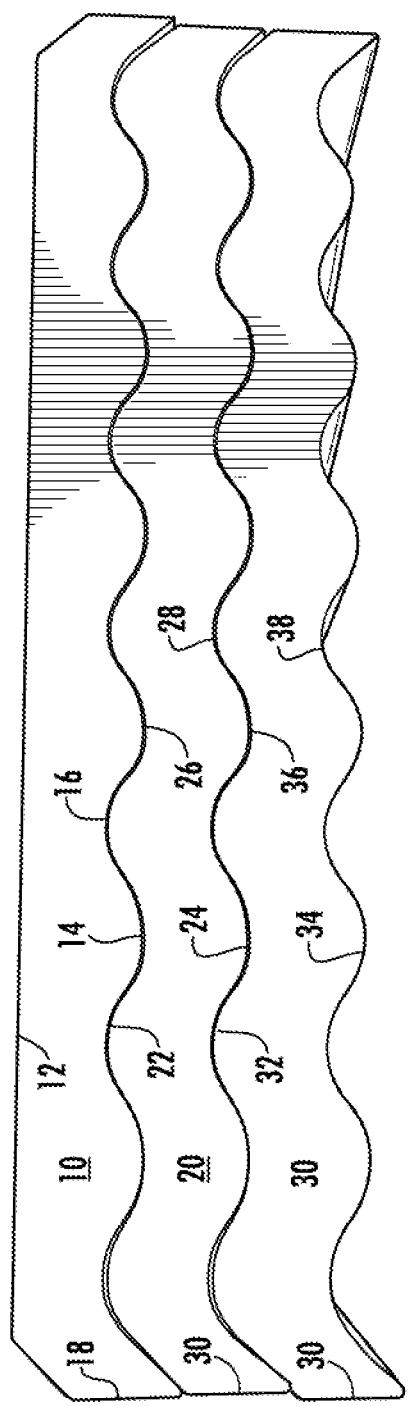

INTERLOCKING FORM ASSEMBLY

CROSS-REFERENCE TO RELATED APPLICATIONS

This application claims the priority to U.S. Provisional Application No. 61/798,029, filed Mar. 15, 2013, entitled "Interlocking Form Assembly," the contents of which is hereby incorporated by reference in its entirety.

BACKGROUND

Forms for creating structural supports, such as concrete beams or joists, have been known for some time. However, there are many steps involved in building the form assembly and many difficulties to overcome before achieving the end result of a structural support of predetermined size.

When a construction project requiring form assemblies is undertaken, the forms are assembled and connected, and a moldable forming composition, such as concrete, is poured over top of the form assembly. In cases where the support structures being created are used in combination with a slab, the length of the slab usually dictates the length of support beams. A form assembly for molding a structural support must be held firmly in place to resist the pressure provided by the moldable forming composition used to create the support, and the form assembly must be capable of maintaining the predetermined shape of the support. The form segments are generally held in place by a frame assembly that must be built on site.

Creating an assembly of the right size and shape can be challenging, especially if the structure is of a length or height requiring multiple form sections to be secured end-to-end and/or stacked in order to obtain the desired length and height. Further, in a single construction project such as constructing a building, slabs, beams and joists of many different sizes are often needed to complete the project. Thus, an effective form assembly of adjustable size is needed for molding structural supports.

SUMMARY

Embodiments of the present invention provide a form assembly for molding a structural support of a predetermined configuration using a moldable forming composition. In particular, embodiments of the present invention provide non-planar interlocking stackable form members for adjusting the height of molded support structures such as joists and beams.

In at least some embodiments, the form assembly comprises a base member having a first planar surface and a second surface comprising at least one recess, and a first extension member having a first surface and a second surface, the first surface comprising at least one non-planar protuberance and the second surface comprising at least one recess corresponding to the position of the non-planar protuberance. The recess of the second surface of the base member is configured to receive the non-planar protuberance of the first surface of the first extension member, enabling the two members to be fitted together, or interlocked, and stacked.

In some embodiments, the form assembly of the present invention comprises a base member having a first planar surface and a second surface comprising a non-planar protuberance, and a first extension member having a first surface and a second surface, the first surface comprising a recess and the second surface comprising a non-planar protuberance corresponding to the position of the recess of the first surface. The recess of the first surface of the first extension member is configured to receive the non-planar protuberance of the second surface of the base member, enabling the two members to be interlocked and stacked.

In some embodiments, the shape of non-planar protuberance and the shape of the recess is selected from the group consisting of sinusoidal, grooved, fluted, ridged, ribbed, wavy, corrugated, undulating, block- or step-shaped, crimped, N-shaped, V-shaped, or U-shaped.

In some embodiments, the base member and the first extension member are made of an expanded polystyrene.

In some embodiments, the base member and the first extension member are secured together by a locking mechanism.

In some embodiments, the base member and the first extension member are of equal length. In some embodiments, the base member and the first extension member are of equal width. In some embodiments, the base member and the first extension member are of equal depth. In some embodiments, the base member and the first extension member are of different depths.

In some embodiments, the form assembly further comprises a second extension member having a first surface and a second surface, the first surface comprising at least one non-planar protuberance and the second surface comprising at least one recess corresponding to the position of the non-planar protuberance, wherein the recess of the second surface of the first extension member is configured to receive the non-planar protuberance of the first surface of the second extension member. Some embodiments provide additional extension members.

In some embodiments, the second extension member is made of an expanded polystyrene.

In some embodiments, the first extension member and the second extension member are secured together by a locking mechanism.

In some embodiments, the first extension member and the second extension member are of equal length. In some embodiments, the first extension member and the second extension member are of equal width. In some embodiments, the first extension member and the second extension member are of equal depth. In some embodiments, the first extension member and the second extension member are of different depths.

In some embodiments of the present invention, the form assembly comprises a base member having a first planar surface and a second surface comprising a plurality of recesses and a plurality of non-planar protuberances, and a first extension member having a first surface and a second surface, each comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface. The base member and the first extension member are configured to stack, so that the plurality of recesses of the base member receive the plurality of non-planar protuberances of one of the first surface and the second surface of the first extension member while simultaneously the plurality of recesses of the same one of the first surface and the second surface of the first extension member receive the plurality of non-planar protuberances of the base member.

In some embodiments, the base member and the first extension member are made of an expanded polystyrene.

In some embodiments, the base member and the first extension member are secured together by a locking mechanism.

In some embodiments, the shape of the plurality of non-planar protuberances and the plurality of recesses is selected from the group consisting of sinusoidal, grooved, fluted, ridged, ribbed, wavy, corrugated, undulating, block- or step-shaped, crimped, N-shaped, V-shaped, or U-shaped.

In some embodiments, the base member and the first extension member are of equal length. In some embodiments, the base member and the first extension member are of equal width. In some embodiments, the base member and the first extension member are of equal depth. In some embodiments, the base member and the first extension member are of different depths.

In some embodiments, the form assembly further comprises a second extension member having a first surface and a second surface, each surface comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface. The first extension member and the second extension member are configured to stack, or mate, so that the plurality of recesses of one of the first surface and second surface of the first extension member receive the plurality of non-planar protuberances of one of the first surface and the second surface of the second extension member while simultaneously the plurality of recesses of the same one of the first surface and the second surface of the second extension member receive the plurality of non-planar protuberances of the same one of the first surface and the second surface of the first extension member. Additional extension members are provided in some embodiments.

In some embodiments, the first extension member and the second extension member are of equal length. In some embodiments, the first extension member and the second extension member are of equal width. In some embodiments, the first extension member and the second extension member are of equal depth. In some embodiments, the first extension member and the second extension member are of different depths.

Embodiments of the present invention provide methods of using a form assembly for molding a structural support of a predetermined configuration using a moldable forming composition. In at least some embodiments, the method of using a form assembly comprises providing a base member having a first planar surface and a second surface comprising at least one recess, and providing a first extension member having a first surface and a second surface, the first surface comprising at least one non-planar protuberance and the second surface comprising at least one recess corresponding to the position of the non-planar protuberance. The recess of the second surface of the base member is configured to receive the non-planar protuberance of the first surface of the first extension member, thereby enabling mating of the base member and the first extension member by stacking of the first extension member and the base member so that the non-planar protuberance of the first surface of the first extension member is fitted into the recess of the second surface of the base member. In some embodiments, the methods provide additional extension members.

In some embodiments, the method further comprises locking the base member and the first extension member together.

In some embodiments, the method further comprises providing a second extension member having a first surface and a second surface, the first surface comprising at least one non-planar protuberance and the second surface comprising at least one recess corresponding to the position of the non-planar protuberance, wherein the recess of the first surface of the first extension member is configured to receive the non-planar protuberance of the first surface of the second extension member. The first extension member and the second extension member are mated, or interlocked, by stacking the second extension member and the first extension member so that the non-planar protuberance of the first surface of the second extension member is fitted into the recess of the second surface of the first extension member. In some embodiments, the methods provide additional extension members.

In some embodiments, the method further comprises locking the first extension member and the second extension member together.

In some embodiments, the method of using a form assembly comprises providing a base member having a first planar surface and a second surface comprising a non-planar protuberance, and providing a first extension member having a first surface and a second surface, the first surface comprising a recess and the second surface comprising a non-planar protuberance corresponding to the position of the recess of the first surface. The recess of the first surface of the first extension member is configured to receive the non-planar protuberance of the second surface of the base member, enabling the two members to be fitted together and stacked, thereby enabling mating of the base member and the first extension member by stacking of the first extension member and the base member so that the non-planar protuberance of the second surface of the base member is fitted into the recess of the first surface of the first extension member. In some embodiments, the methods provide additional extension members.

In some embodiments, the method further comprises locking the base member and the first extension member together.

In some embodiments, the method further comprises providing a second extension member having a first surface and a second surface, the first surface comprising a recess and the second surface comprising non-planar protuberance corresponding to the position of the recess, wherein the recess of the first surface of the second extension member is configured to receive the non-planar protuberance of the second surface of the first extension member. The first extension member and the second extension member are mated, or interlocked, by stacking the second extension member and the first extension member so that the non-planar protuberance of the second surface of the first extension member is fitted into the recess of the first surface of the second extension member. In some embodiments, the methods provide additional extension members.

In some embodiments, the method further comprises locking the first extension member and the second extension member together.

In some embodiments, the present invention provides a method of using a form assembly for molding a structural support comprising providing a base member having a first planar surface and a second surface comprising a plurality of recesses and a plurality of non-planar protuberances, and providing a first extension member having a first surface and a second surface, each comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface. The base member and the first extension member are mated by stacking so that the plurality of recesses of the base member receive the plurality of non-planar protuberances of one of the first surface and the second surface of the second extension member while simultaneously the plurality of recesses of the same one of the first surface and the second surface of the first extension member receive the plurality of non-planar protuberances of the base member.

In some embodiments, the method further comprises locking the base member and the first extension member together.

In some embodiments, the method further comprises providing a second extension member having a first surface and a second surface, each comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface. The first extension member and the second extension member are mated by so that the plurality of recesses of one of the first surface and second surface of the first extension member receive the plurality of non-planar protuberances of one of the first surface and the second surface of the second extension member while simultaneously the plurality of recesses of the same one of the first surface and the second surface of the second extension member receive the plurality of non-planar protuberances of the same one of the first surface and the second surface of the first extension member. In some embodiments, the methods provide additional extension members.

In some embodiments, the method further comprises locking the first extension member and the second extension member together.

Thus, there is provided form members, a form assembly and associated methods for forming structural supports that can be used to configure different sizes and shapes of structural supports.

BRIEF DESCRIPTION OF THE DRAWINGS

FIG. 1B is a side view illustrating a form assembly for molding a structural support of a predetermined configuration using a moldable forming composition according to one embodiment of the present invention, wherein a base extension and a first extension are shown stacked together as they would be during use.

FIG. 2B is a side view illustrating a form assembly for molding a structural support of a predetermined configuration using a moldable forming composition according to one embodiment of the present invention, wherein a base extension, a first extension, and a second extension are shown stacked together as they would be during use.

DETAILED DESCRIPTION

Figure 1A:
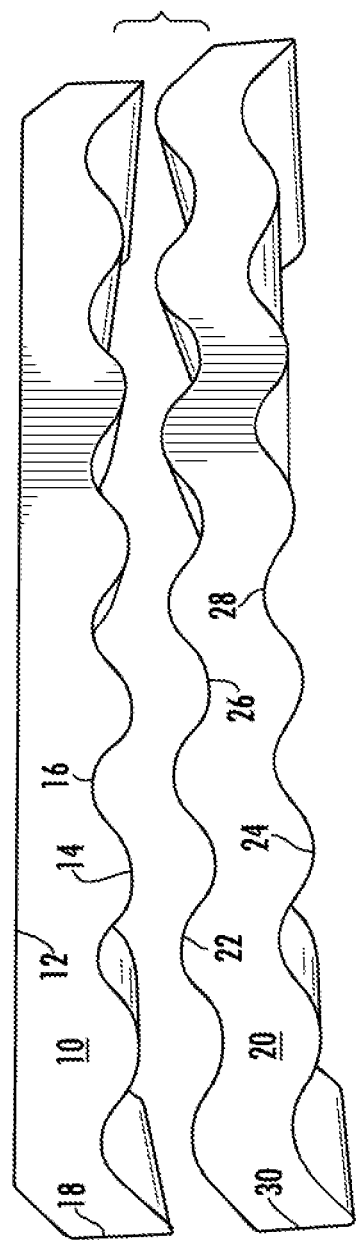
FIG. 1A is a side view illustrating a form assembly for molding a structural support of a predetermined configuration using a moldable forming composition according to one embodiment of the present invention, wherein a base extension and a first extension are shown in an exploded view.

The following detailed description refers to the accompanying drawings, which illustrate specific embodiments of the invention. Other embodiments having different structures and operation do not depart from the scope of the present invention.

Embodiments of the invention are described with reference to drawings included herewith. Like reference numbers refer to like structures throughout. It should be noted that the drawings are schematic in nature. Not all parts are always shown to scale. The drawings illustrate but a few specific embodiments of the invention.

Embodiments of the present invention provide a form assembly for molding a structural support of a predetermined configuration using a moldable forming composition. In particular, embodiments of the present invention provide interlocking stackable form members for adjusting the height of molded support structures such as joists and beams.

In at least some embodiments, the form assembly comprises a base member having a first planar surface and a second surface comprising at least one recess, and a first extension member having a first surface and a second surface, the first surface comprising at least one non-planar protuberance and the second surface comprising at least one recess corresponding to the position of the non-planar protuberance. The recess of the second surface of the base member is configured to receive the non-planar protuberance of the first surface of the first extension member, enabling the two members to be fitted together, or interlocked, and stacked.

In some embodiments, the form assembly of the present invention comprises a base member having a first planar surface and a second surface comprising a non-planar protuberance, and a first extension member having a first surface and a second surface, the first surface comprising a recess and the second surface comprising a non-planar protuberance corresponding to the position of the recess of the first surface. The recess of the first surface of the first extension member is configured to receive the non-planar protuberance of the second surface of the base member, enabling the two members to be fitted together, or interlocked, and stacked.

The form assembly of the present invention is meant to be used with already-existing systems for creating support structures such as concrete joists and beams. The form assembly of the present invention provides a form assembly and methods of use for creating support structures of predetermined size and can be used as part of a larger construction project. Once the form assembly of the present invention is constructed, a pourable molding composition is added to create the support structure. Those of ordinary skill in the art easily recognize the advantages of the present invention and how to incorporate it into known systems and methods.

In some embodiments, the shape of the non-planar protuberance and the shape of the recess is selected from the group consisting of sinusoidal, grooved, fluted, ridged, ribbed, wavy, corrugated, undulating, block- or step-shaped, crimped, N-shaped, V-shaped, or U-shaped.

In some embodiments, the base member and the first extension member are made of an expanded polystyrene.

In some embodiments, the base member and the first extension member are secured together by a locking mechanism.

In some embodiments, the base member and the first extension member are of equal length. In some embodiments, the base member and the first extension member are of equal width. Providing a base member and an extension member of equal length and width eliminates joints in the form assembly that occur when the base member and the extension member are of different lengths or widths.

In some embodiments, the base member and the extension member are of equal depth. In some embodiments, the base member and the extension member are of different depths.

In some embodiments, the form assembly further comprises a second extension member having a first surface and a second surface, the first surface comprising at least one non-planar protuberance and the second surface comprising at least one recess corresponding to the position of the non-planar protuberance, wherein the recess of the second surface of the first extension member is configured to receive the non-planar protuberance of the first surface of the second extension member. Some embodiments provide additional extension members.

In some embodiments, the second extension member is made of an expanded polystyrene.

In some embodiments, the first extension member and the second extension member are secured together by a locking mechanism.

In some embodiments of the present invention, the members of the form assembly are elongated to a predetermined length that can vary based upon the specific requirements and specifications of the support structures to be formed, as well as shipping and manufacturing considerations.

Further, in at least some embodiments of the present invention, the extension members of the form assembly of the present invention are produced in different predetermined thicknesses, or depths, that can be stacked in any combination to achieve a structural support of a desired height. In one example, two extension members are stacked. In another example, three extension members are stacked. In yet another example, four extension members are stacked. In still another example, five extension members are stacked. The stacked extension members can be of the same thickness or can be of different thicknesses.

The extension members can be manufactured in any thickness. For example, extension members can be produced in the following thicknesses: 2 inches, 4 inches, 6 inches, 8 inches, 10 inches, 12 inches, 14 inches, 16 inches, 18 inches, and 20 inches. Other thicknesses are possible and are recognized by those of ordinary skill in the art as falling within the scope of the present invention.

Further embodiments of the present invention provide a form assembly comprising a base member having a first planar surface and a second surface comprising a plurality of recesses and a plurality of non-planar protuberances, and a first extension member having a first surface and a second surface, each comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface. The base member and the first extension member are configured to stack, so that the plurality of recesses of the base member receive the plurality of non-planar protuberances of one of the first surface and the second surface of the first extension member while simultaneously the plurality of recesses of the same one of the first surface and the second surface of the first extension member receive the plurality of non-planar protuberances of the base member.

In some embodiments, the base member and the first extension member are made of an expanded polystyrene.

In some embodiments, the base member and the first extension member are secured together by a locking mechanism.

The form members of the present invention fit together like a lock and key, or like pieces of a jigsaw puzzle, by utilizing the non-planar protuberances and the recesses. Each recess is configured to receive a non-planar protuberance. Thus, the members of the present invention can be fitted, mated, or interlocked together. The recesses and non-planar protuberances of the form members of the present invention provide a secure system for stacking form members, as the fitting of the non-planar protuberances into the recesses prevents the stacked, interlocked members from moving apart.

The non-planar protuberances, or projections, and the recesses can be of any non-planar shape. In some embodiments, the shape of the plurality of non-planar protuberances and the shape of the recesses is selected from the group consisting of sinusoidal, grooved, fluted, ridged, ribbed, wavy, corrugated, undulating, block- or step-shaped, trapezoidal-shaped, crimped, N-shaped, V-shaped, or U-shaped. Any shape can be used so long as it provides a non-planar protuberance or projection. A non-planar protuberance of any shape, in combination with a recess configured to receive the non-planar protuberance, can be used to create the interlocking stackable members of the present invention.

Further, it is not necessary for all of the protuberances or recesses on a single member to be identical in shape, nor must all be identical in size so long as the form members of the assembly are configured to interlock, or mate, together. In one example, a single member has protuberances and recesses that are sinusoidal in shape, and are all substantially the same size, as shown in FIG. 1. In another example, a single member has protuberances and recesses that are sinusoidal in shape, and that alternate in size from large to small to large again. In yet another example, a single member has protuberances and recesses that alternately U-shaped, V-shaped, and N-shaped configurations of roughly the same size. In still another example, a single member has protuberances and recesses that alternate blockor trapezoidal- or step-shaped configurations that incrementally increase in size for three protuberances and then incrementally decrease in size for three protuberances. One of skill in the art would recognize that any combination of shapes and sizes is possible and would fall within the scope of the present invention.

In some embodiments, the form assembly further comprises a second extension member, having a first surface and a second surface, each comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface. The first extension member and the second extension member are configured to stack, or mate, so that the plurality of recesses of one of the first surface and second surface of the first extension member receive the plurality of non-planar protuberances of one of the first surface and the second surface of the second extension member while simultaneously the plurality of recesses of the same one of the first surface and the second surface of the second extension member receive the plurality of non-planar protuberances of the same one of the first surface and the second surface of the first extension member. Additional extension members are provided in some embodiments, and any desired number of extension members can be stacked.

Embodiments of the present invention provide methods of using a form assembly for molding a structural support of a predetermined configuration using a moldable forming composition. In at least some embodiments, the method of using a form assembly comprises providing a base member having a first planar surface and a second surface comprising at least one recess, and providing a first extension member having a first surface and a second surface, the first surface comprising at least one non-planar protuberance and the second surface comprising at least one recess corresponding to the position of the non-planar protuberance. The recess of the second surface of the base member is configured to receive the non-planar protuberance of the first surface of the first extension member, thereby enabling mating of the base member and the first extension member by stacking of the first extension member and the base member so that the non-planar protuberance of the first surface of the first extension member is fitted into the recess of the second surface of the base member.

In some embodiments, the method further comprises locking the base member and the first extension member together.

In some embodiments, the method further comprises providing a second extension member having a first surface and a second surface, the first surface comprising at least one non-planar protuberance and the second surface comprising at least one recess corresponding to the position of the non-planar protuberance, wherein the recess of the first surface of the first extension member is configured to receive the non-planar protuberance of the first surface of the second extension member. The first extension member and the second extension member are mated by stacking the second extension member and the first extension member so that the non-planar protuberance of the first surface of the second extension member is fitted into the recess of the second surface of the first extension member. In some embodiments, the methods provide additional extension members. Any desired number of extension members can be stacked according to the methods of the present invention.

In some embodiments, the method of using a form assembly comprises providing a base member having a first planar surface and a second surface comprising a non-planar protuberance, and providing a first extension member having a first surface and a second surface, the first surface comprising a recess and the second surface comprising a non-planar protuberance corresponding to the position of the recess of the first surface. The recess of the first surface of the first extension member is configured to receive the non-planar protuberance of the second surface of the base member, enabling the two members to be fitted together and stacked, thereby enabling mating of the base member and the first extension member by stacking of the first extension member and the base member so that the non-planar protuberance of the second surface of the base member is fitted into the recess of the first surface of the first extension member. In some embodiments, the methods provide additional extension members.

In some embodiments, the method further comprises locking the base member and the first extension member together.

In some embodiments, the method further comprises providing a second extension member having a first surface and a second surface, the first surface comprising a recess and the second surface comprising non-planar protuberance corresponding to the position of the recess, wherein the recess of the first surface of the second extension member is configured to receive the non-planar protuberance of the second surface of the first extension member. The first extension member and the second extension member are mated by stacking the second extension member and the first extension member so that the non-planar protuberance of the second surface of the first extension member is fitted into the recess of the first surface of the second extension member. In some embodiments, the methods provide additional extension members.

In some embodiments, the method further comprises locking the first extension member and the second extension member together.

In some embodiments, the present invention provides a method of using a form assembly for molding a structural support comprising providing a base member having a first planar surface and a second surface comprising a plurality of recesses and a plurality of non-planar protuberances, and providing a first extension member having a first surface and a second surface, each comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface. The base member and the first extension member are mated by stacking so that the plurality of recesses of the base member receive the plurality of non-planar protuberances of one of the first surface and the second surface of the second extension member while simultaneously the plurality of recesses of the same one of the first surface and the second surface of the first extension member receive the plurality of non-planar protuberances of the base member.

In some embodiments, the method further comprises locking the base member and the first extension member together.

In some embodiments, the method further comprises providing a second extension member having a first surface and a second surface, each comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface. The first extension member and the second extension member are mated by so that the plurality of recesses of one of the first surface and second surface of the first extension member receive the plurality of non-planar protuberances of one of the first surface and the second surface of the second extension member while simultaneously the plurality of recesses of the same one of the first surface and the second surface of the second extension member receive the plurality of non-planar protuberances of the same one of the first surface and the second surface of the first extension member. In some embodiments, the methods provide additional extension members.

In some embodiments, the method further comprises locking the first extension member and the second extension member together.

In at least some embodiments, the frame for supporting the form assembly of the present invention comprises further components such as steel studs embedded in the base member to provide additional strength to the system. One of ordinary skill in the art understands that the present invention works within presently existing systems for creating structural supports.

Figure 1C:
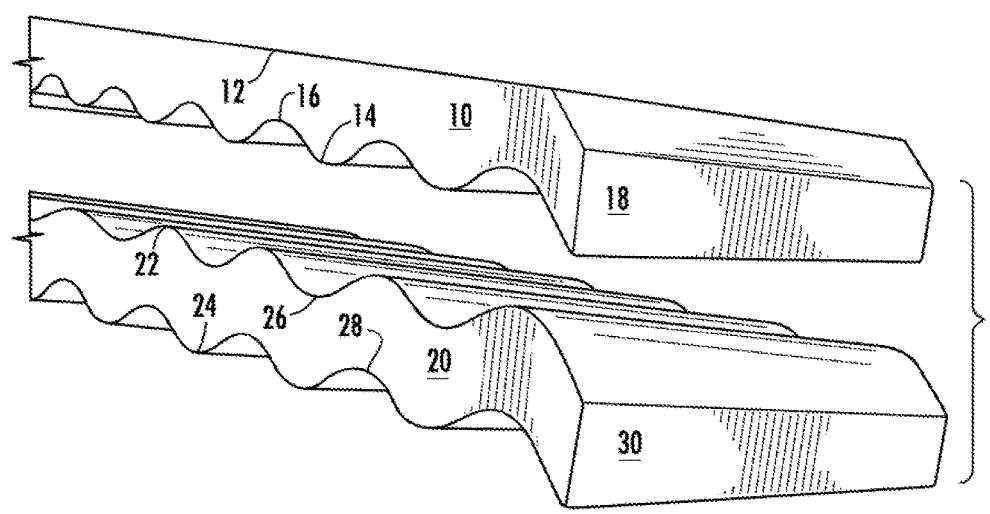
FIG. 1C is an end view illustrating a form assembly for molding a structural support of a predetermined configuration using a moldable forming composition according to one embodiment of the present invention, wherein a base extension and a first extension are shown in an exploded view.
Figure 2A:
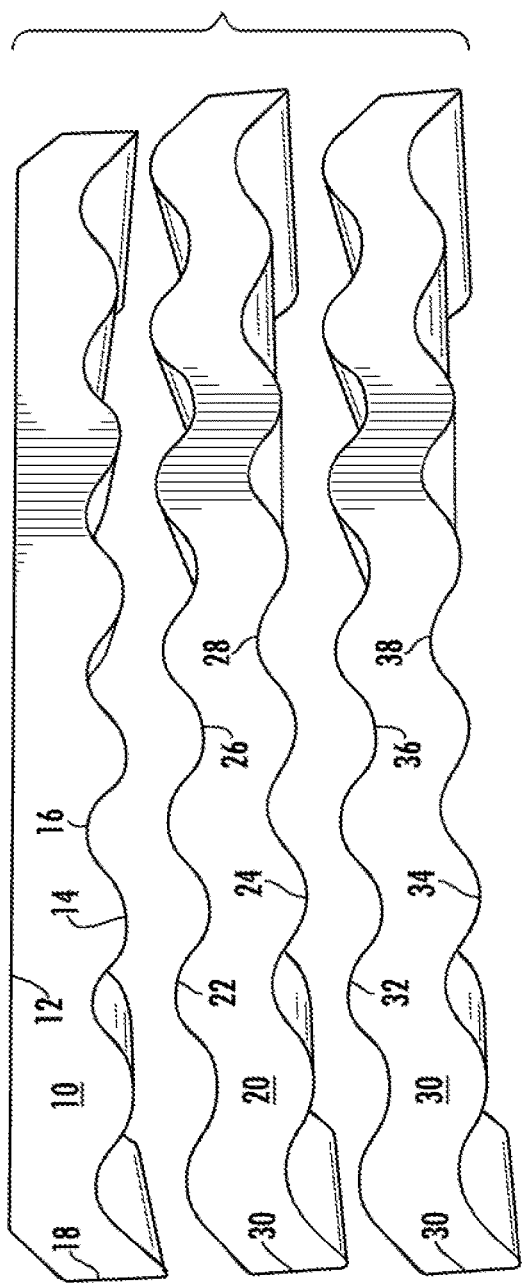
FIG. 2A is a side view illustrating a form assembly for molding a structural support of a predetermined configuration using a moldable forming composition according to one embodiment of the present invention, wherein a base extension, a first extension, and a second extension are shown in an exploded view.

FIGS. 1A-1C show a form assembly for molding a structural support of a predetermined configuration using a moldable forming composition according to one embodiment of the invention. FIG. 1A shows an exploded view of a base member 10 and an extension member 20.

Base member 10 has two parallel short side edges, two parallel long side edges, a first surface 12 that is a planar surface and a second surface having non-planar protuberances such as 14 and recesses such as 16. Base member 10 further has short side edges (18 and its parallel edge at the opposite end of base member 10) that are beveled to create a flat side surface when fitted with an extension member. The long side edges include the edge with the reference numerals written upon it, and its parallel edge at the opposite side of base member 10 that is not visible in FIG. 1A.

Still referring to FIG. 1A, extension member 20 has two parallel short side edges, two parallel long side edges, a first surface and a second surface, the first surface and the second surface having non-planar protuberances (such as 22, 24) and recesses (such as 26, 28). Extension member 20, like base member 10, has short side edges (30 and its parallel edge at the opposite end of base member 20) that are beveled so that a flat side surface is created when extension member 20 is fitted with a base member or with another extension member.

The "surfaces" of the present invention are the surfaces of the members that can come into direct contact with another form member when stacking occurs. Extension member 20 does not have a planar surface. Base member 10 has one planar surface and one non-planar surface.

FIG. 1B shows base member 10 and extension member 20 stacked, interlocked, or mated, as they would be during use in a form assembly. The non-planar protuberances 14 of base member 10 fit into the recesses 26 of extension member 20, and the non-planar protuberances 22 of extension member 20 fit into the recesses 16 of base member 10. Thus, stacking, or interlocking, the two members together provides a secure form assembly. Stacking two extension members together would look very similar, except that all surfaces would be non-planar. Multiple extension members can be stacked according to the methods of the present invention.

FIG. 1C shows an end view of base member 10 and extension member 20 in an exploded view, providing another view of the beveled side edges 18 and 30. The beveled side edge configuration provides a flat side edge when form members are stacked, making it convenient to fit the stacked form members into a larger form system.

The particular physical appearances of the form members included are examples only. Numerous types of form members can be created using embodiments of the invention, along with various types of assemblies. In various embodiments, the form members of the assembly may comprise any of the features disclosed herein for a form member of the invention. Form members include base members and extension members.

A base member or extension member of the form assembly according to example embodiments of the invention can vary in size, shape and thickness. The base member or extension member can be sized and shaped in accordance with the profile of the assembly, the size and specifications of the support structure desired, as well as manufacturing and shipping considerations. In the embodiments disclosed here, a base member or extension member is configured with a sinusoidal shape and sized to work with the dimensions of a standard assembly frame.

It cannot be overemphasized that the form members of FIGS. 1A-1C are examples only, and a form assembly according to an embodiment of the invention can be made in various ways.

The various portions of the form assembly according to example embodiments of the invention can be made of any of various materials. The form base member and extension member can be made of metal, wood or plastic, as can the various portions of the assembly frame for the components of the form. The form base member and extension member can be made of a buoyant material. In some embodiments, the buoyant material is a formed plastic body. In some embodiments, the buoyant material is expanded polystyrene. In some embodiments, the form base member and extension member can be made of masonite or an equivalent or can be made of fiberboard laminated to expanded polystyrene.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "less" and "greater", are intended to encompass the concept of equality, thus, "less" can mean not only "less" in the strictest mathematical sense, but also, "less than or equal to."

It should also be pointed out that references may be made throughout this disclosure to figures and descriptions using terms such as "top", "side", "within", "beside", "on", and other terms which imply a relative position of a structure, portion or view. These terms are used merely for convenience and refer only to the relative position of features as shown from the perspective of the reader. An element that is placed or disposed atop another element in the context of this disclosure can be functionally in the same place in an actual product but be beside or below the other element relative to an observer due to the orientation of a device or equipment. Any discussions which use these terms are meant to encompass various possibilities for orientation and placement.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A form assembly for molding a structural support of a predetermined configuration using a moldable forming composition, the form assembly comprising:

a base member having planar first and second opposite side edges and a first planar surface and a second surface comprising a first recess, the base member further comprising a planar corner surface extending between the first planar surface and at least one of the planar first and second opposite side edges forming a bevel; and a first extension member having a first surface and a second surface, the first surface comprising a non-planar protuberance and the second surface comprising a second recess corresponding to the position of the non-planar protuberance of the first surface, wherein the base member and the first extension member are made of an expanded polystyrene and wherein the first recess of the second surface of the base member is configured to receive the non-planar protuberance of the first surface of the first extension member.

2. A form assembly for molding a structural support of a predetermined configuration using a moldable forming composition, the form assembly comprising:

a base member having planar first and second opposite side edges and a first planar surface and a second surface comprising a non-planar protuberance, the base member further comprising a planar corner surface extending between the first planar surface and at least one of the planar first and second opposite side edges forming a bevel; and a first extension member having a first surface and a second surface, the first surface comprising a recess and the second surface comprising a non-planar protuberance corresponding to the position of the recess of the first surface, wherein the base member and the first extension member are made of an expanded polystyrene and wherein the recess of the first surface of the first extension member is configured to receive the non-planar protuberance of the second surface of the base member.

3. The form assembly of claim 1 or claim 2, wherein at least one of the shape of the non-planar protuberance, the shape of the first recess, and the shape of the second recess is selected from the group consisting of sinusoidal, grooved, fluted, ridged, ribbed, wavy, corrugated, undulating, block- or step-shaped, trapezoidal-shaped, crimped, N-shaped, V-shaped, and U-shaped.

4. The form assembly of claim 1 or claim 2, wherein the base member and the first extension member are secured together.

5. The form assembly of claim 1 further comprising a second extension member having a first surface and a second surface, the first surface comprising a non-planar protuberance and the second surface comprising a recess corresponding to the position of the non-planar protuberance, wherein the recess of the second surface of the first extension member is configured to receive the non-planar protuberance of the first surface of the second extension member.

6. The form assembly of claim 2 further comprising a second extension member having a first surface and a second surface, the first surface comprising a recess and the second surface comprising a non-planar protuberance corresponding to the position of the recess, wherein the recess of the first surface of the second extension member is configured to receive the non-planar protuberance of the second surface of the first extension member.

7. A form assembly for molding a structural support of a predetermined configuration using a moldable forming composition, the form assembly comprising:

a base member having planar first and second opposite side edges and a first planar surface and a second surface comprising a plurality of recesses and a plurality of non-planar protuberances, the base member further comprising a planar corner surface extending between the first planar surface and at least one of the planar first and second opposite side edges forming a bevel; and a first extension member having a first surface and a second surface, each surface comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface, wherein the base member and the first extension member are made of an expanded polystyrene and wherein the plurality of recesses of the base member receive the plurality of non-planar protuberances of one of the first surface and the second surface of the first extension member while simultaneously the plurality of recesses of the same one of the first surface and the second surface of the first extension member receive the plurality of non-planar protuberances of the base member.

8. The form assembly of claim 7, wherein the base member and the first extension member are secured together by a locking mechanism.

9. The form assembly of claim 7, wherein the shape of at least one of the plurality of non-planar protuberances of the base member, the plurality of non-planar protuberances of the first extension member, the plurality of recesses of the base member, and the plurality of recesses of the first extension member are selected from the group consisting of sinusoidal, grooved, fluted, ridged, ribbed, wavy, corrugated, undulating, block- or step-shaped, trapezoidal-shaped, crimped, N-shaped, V-shaped, and U-shaped.

10. The form assembly of claim 7 further comprising:

a second extension member having a first surface and a second surface, each surface comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface so that the plurality of recesses of one of the first surface and second surface of the first extension member receive the plurality of non-planar protuberances of one of the first surface and the second surface of the second extension member while simultaneously the plurality of recesses of the same one of the first surface and the second surface of the second extension member receive the plurality of non-planar protuberances of the same one of the first surface and the second surface of the first extension member.

11. A method of using a form assembly for molding a structural support of a predetermined configuration using a moldable forming composition, the method comprising:

providing a base member having planar first and second opposite side edges and a first planar surface and a second surface comprising a first recess, the base member further comprising a planar corner surface extending between the first planar surface and at least one of the planar first and second opposite side edges forming a bevel;

providing a first extension member having a first surface and a second surface, the first surface comprising a non-planar protuberance and the second surface comprising a recess corresponding to the position of the non-planar protuberance, wherein the base member and the first extension member are made of an expanded polystyrene and wherein the recess of the second surface of the base member is configured to receive the non-planar protuberance of the first surface of the first extension member; and stacking the first extension member and the base member so that the non-planar protuberance of the first surface of the first extension member is fitted into the recess of the second surface of the base member.

12. A method of using a form assembly for molding a structural support of a predetermined configuration using a moldable forming composition, the method comprising:

providing a base member having planar first and second opposite side edges and a first planar surface and a second surface comprising a non-planar protuberance, the base member further comprising a planar corner surface extending between the first planar surface and at least one of the planar first and second opposite side edges forming a bevel;

providing a first extension member having a first surface and a second surface, the first surface comprising a recess and the second surface comprising a non-planar protuberance corresponding to the position of the recess, wherein the base member and the first extension member are made of an expanded polystyrene and wherein the recess of the first surface of the first extension member is configured to receive the non-planar protuberance of the second surface of the base member; and stacking the first extension member and the base member so that the non-planar protuberance of the second surface of the base member is fitted into the recess of the first surface of the first extension member.

13. The method of claim 11 or claim 12, wherein the method further comprises locking the base member and the first extension member together.

14. The method of claim 11, further comprising:

providing a second extension member having a first surface and a second surface, the first surface comprising a non-planar protuberance and the second surface comprising a recess corresponding to the position of the non-planar protuberance, wherein the recess of the second surface of the first extension member is configured to receive the non-planar protuberance of the first surface of the second extension member; and stacking the second extension member and the first extension member so that the non-planar protuberance of the first surface of the second extension member is fitted into the recess of the second surface of the first extension member.

15. The method of claim 12, further comprising:

providing a second extension member having a first surface and a second surface, the first surface comprising a recess and the second surface comprising a non-planar protuberance corresponding to the position of the recess, wherein the recess of the first surface of the second extension member is configured to receive the non-planar protuberance of the second surface of the first extension member; and stacking the second extension member and the first extension member so that the non-planar protuberance of the second surface of the first extension member is fitted into the recess of the first surface of the second extension member.

16. The method of claim 14 or claim 15, further comprising locking the first extension member and the second extension member together.

17. A method of using a form assembly for molding a structural support, the method comprising:

providing a base member having planar first and second opposite side edges and a first planar surface and a second surface comprising a plurality of recesses and a plurality of non-planar protuberances, the base member further comprising a planar corner surface extending between the first planar surface and at least one of the planar first and second opposite side edges forming a bevel;

providing a first extension member having a first surface and a second surface, each surface comprising a plurality of non-planar protuberances and a plurality of recesses, wherein the base member and the first extension member are made of an expanded polystyrene and wherein an occurrence of a non-planar protuberance on the first surface corresponds to an occurrence of a recess on the second surface and an occurrence of a recess on the first surface corresponds to an occurrence of a non-planar protuberance on the second surface; and stacking the base member and the first extension member so that the plurality of recesses of the base member receive the plurality of non-planar protuberances of one of the first surface and the second surface of the first extension member while simultaneously the plurality of recesses of the same one of the first surface and the second surface of the first extension member receive the plurality of non-planar protuberances of the base member.

18. The method of claim 17, further comprising locking the base member and the first extension member together.

19. The method of claim 17, further comprising:

providing a second extension member having a first surface and a second surface, each surface comprising a plurality of non-planar protuberances and a plurality of recesses, wherein an occurrence of a non-planar protuberance on the first surface corresponds to an occurrence of a recess on the second surface and an occurrence of a recess on the first surface corresponds to an occurrence of a non-planar protuberance on the second surface; and stacking the first extension member and the second extension member so that the plurality of recesses of one of the first surface and second surface of the first extension member receive the plurality of non-planar protuberances of one of the first surface and the second surface of the second extension member while simultaneously the plurality of recesses of the same one of the first surface and the second surface of the second extension member receive the plurality of non-planar protuberances of the same one of the first surface and the second surface of the first extension member.

20. The method of claim 19, further comprising locking the first extension member and the second extension member together.

* * * * *